US008723825B2

(12) United States Patent
Wright et al.

(10) Patent No.: US 8,723,825 B2
(45) Date of Patent: May 13, 2014

(54) PREDICTIVE TOUCH SURFACE SCANNING

(75) Inventors: David G. Wright, San Diego, CA (US); Steven Kolokowsky, San Diego, CA (US); Edward L. Grivna, Brooklyn Park, MN (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 13/250,379

(22) Filed: Sep. 30, 2011

(65) Prior Publication Data

US 2012/0154324 A1   Jun. 21, 2012

Related U.S. Application Data

(63) Continuation-in-part of application No. 12/844,798, filed on Jul. 27, 2010.

(60) Provisional application No. 61/229,236, filed on Jul. 28, 2009.

(51) Int. Cl.
*G06F 3/041* (2006.01)

(52) U.S. Cl.
USPC .......................... 345/173; 345/156; 345/174

(58) Field of Classification Search
USPC .......................................... 345/156, 173–174
See application file for complete search history.

(56) References Cited

U.S. PATENT DOCUMENTS

| | | | |
|---|---|---|---|
| 4,918,262 A | 4/1990 | Flowers et al. | |
| 4,935,728 A | 6/1990 | Kley | |
| 5,239,140 A | 8/1993 | Kuroda et al. | |
| 5,374,787 A | 12/1994 | Miller et al. | |
| 5,495,077 A | 2/1996 | Miller et al. | |
| 5,648,642 A | 7/1997 | Miller et al. | |
| 5,825,352 A | 10/1998 | Bisset et al. | |
| 5,841,078 A | 11/1998 | Miller et al. | |
| 5,872,561 A | 2/1999 | Figie et al. | |
| 5,920,309 A | 7/1999 | Bisset et al. | |
| 6,292,173 B1 | 9/2001 | Rambaldi et al. | |
| 6,396,484 B1 | 5/2002 | Adler et al. | |
| 6,762,752 B2 | 7/2004 | Perski et al. | |
| 7,019,672 B2 | 3/2006 | Ely | |
| 7,100,430 B2 | 9/2006 | Samsavar et al. | |
| 7,307,485 B1 | 12/2007 | Snyder et al. | |
| 7,375,535 B1 | 5/2008 | Kutz et al. | |
| 7,428,191 B1 | 9/2008 | Klein | |

(Continued)

FOREIGN PATENT DOCUMENTS

WO   2012177571 A   12/2012

OTHER PUBLICATIONS

USPTO Non-Final Rejection for U.S. Appl. No. 12/844,798 dated Oct. 10, 2012; 19 pages.

(Continued)

*Primary Examiner* — Christopher E Leiby

(57) ABSTRACT

A method for locating a conductive object at a touch-sensing surface may include detecting a first resolved location for the conductive object at the touch-sensing surface based on a first scan of the touch-sensing surface, predicting a location for the conductive object, and determining a second resolved location for the conductive object by performing a second scan of a subset of sensor elements of the touch-sensing surface, wherein the subset of sensor elements is selected based on the predicted location of the conductive object.

20 Claims, 9 Drawing Sheets

(56) References Cited

U.S. PATENT DOCUMENTS

| | | | |
|---|---|---|---|
| 7,982,723 B2* | 7/2011 | Ningrat | 345/174 |
| 8,120,591 B2 | 2/2012 | Krah et al. | |
| 8,305,357 B2 | 11/2012 | Liao et al. | |
| 8,315,832 B1 | 11/2012 | Seguine | |
| 8,350,826 B2 | 1/2013 | Watanabe | |
| 8,436,831 B2 | 5/2013 | Wei et al. | |
| 8,462,127 B2 | 6/2013 | Chiu et al. | |
| 2002/0015024 A1 | 2/2002 | Westerman et al. | |
| 2005/0013492 A1 | 1/2005 | Hattori | |
| 2005/0068044 A1 | 3/2005 | Peine et al. | |
| 2005/0129292 A1 | 6/2005 | Morgeneier et al. | |
| 2005/0134292 A1 | 6/2005 | Knoedgen | |
| 2006/0161871 A1 | 7/2006 | Hotelling et al. | |
| 2006/0192690 A1 | 8/2006 | Philipp | |
| 2006/0197752 A1 | 9/2006 | Hurst et al. | |
| 2006/0219692 A1 | 10/2006 | Unsworth | |
| 2007/0008299 A1 | 1/2007 | Hristov | |
| 2007/0121959 A1 | 5/2007 | Philipp | |
| 2007/0182718 A1 | 8/2007 | Schoener et al. | |
| 2007/0188518 A1 | 8/2007 | Vale | |
| 2007/0229468 A1 | 10/2007 | Peng et al. | |
| 2007/0229470 A1 | 10/2007 | Snyder et al. | |
| 2007/0235231 A1 | 10/2007 | Loomis et al. | |
| 2007/0273659 A1 | 11/2007 | Xiaoping et al. | |
| 2008/0024455 A1 | 1/2008 | Lee et al. | |
| 2008/0048997 A1* | 2/2008 | Gillespie et al. | 345/174 |
| 2008/0079699 A1 | 4/2008 | Mackey | |
| 2008/0150906 A1* | 6/2008 | Grivna | 345/173 |
| 2008/0158180 A1 | 7/2008 | Krah et al. | |
| 2008/0246723 A1 | 10/2008 | Baumbach | |
| 2008/0277171 A1 | 11/2008 | Wright | |
| 2009/0009485 A1 | 1/2009 | Bytheway | |
| 2009/0096757 A1* | 4/2009 | Hotelling et al. | 345/173 |
| 2009/0128516 A1* | 5/2009 | Rimon et al. | 345/174 |
| 2009/0160787 A1* | 6/2009 | Westerman et al. | 345/173 |
| 2009/0273579 A1 | 11/2009 | Zachut et al. | |
| 2009/0284495 A1* | 11/2009 | Geaghan et al. | 345/174 |
| 2009/0309851 A1 | 12/2009 | Bernstein | |
| 2010/0007631 A1* | 1/2010 | Chang | 345/174 |
| 2010/0039405 A1* | 2/2010 | Chen et al. | 345/174 |
| 2010/0073301 A1* | 3/2010 | Yousefpor et al. | 345/173 |
| 2010/0073318 A1* | 3/2010 | Hu et al. | 345/174 |
| 2010/0097328 A1* | 4/2010 | Simmons et al. | 345/173 |
| 2010/0117981 A1* | 5/2010 | Chen et al. | 345/174 |
| 2010/0155153 A1 | 6/2010 | Zachut | |
| 2010/0292945 A1 | 11/2010 | Reynolds et al. | |
| 2010/0315375 A1 | 12/2010 | Yang | |
| 2011/0025629 A1 | 2/2011 | Grivna et al. | |
| 2012/0105362 A1 | 5/2012 | Kremin et al. | |
| 2012/0154324 A1 | 6/2012 | Wright et al. | |
| 2012/0162124 A1 | 6/2012 | Lin | |
| 2012/0242612 A1 | 9/2012 | Chang | |
| 2012/0261199 A1 | 10/2012 | Kuo et al. | |
| 2012/0268415 A1 | 10/2012 | Konovalov et al. | |
| 2012/0280929 A1 | 11/2012 | Rimon et al. | |
| 2012/0327042 A1 | 12/2012 | Harley et al. | |
| 2013/0100071 A1 | 4/2013 | Wright et al. | |

OTHER PUBLICATIONS

U.S. Appl. No. 12/167,494: "Method for Improving Scan Time and Sensitivity in Touch Sensitive User Interface Device" Ryan D. Seguine et al., filed Jul. 3, 2008; 42 pages.
U.S. Appl. No. 12/844,798 "Dynamic Mode Switching for Fast Touch Response," Edward Grivna et al., filed Jul. 27, 2010; 65 pages.
U.S. Appl. No. 13/591,145: "Predictive Touch Surface Scanning" David G. Wright et al., filed Aug. 21, 2012; 64 pages.
U.S. Appl. No. 13/741,090: "Multi-Stage Stylus Scanning," Ruslan Omelchuk, filed Jan. 14, 2013; 58 pages.
International Search Report for International Application No. PCT/US08/69108 dated Sep. 26, 2008; 2 pages.
International Search Report for International Application No. PCT/US10/43590 dated Sep. 27, 2010; 2 pages.
International Search Report for International Application No. PCT/US12/64222 dated Dec. 19, 2012; 4 pages.
USPTO Advisory Action for U.S. Appl. No. 12/167,494 dated May 27, 2011; 3 pages.
USPTO Advisory Action for U.S. Appl. No. 12/167,494 dated Aug. 10, 2012; 3 pages.
USPTO Advisory Action for U.S. Appl. No. 12/844,798 dated May 9, 2013; 3 pages.
USPTO Advisory Action for U.S. Appl. No. 12/844,798 dated Aug. 23, 2012; 3 pages.
USPTO Advisory Action for U.S. Appl. No. 12/844,798 dated Apr. 10, 2013, 3pages.
USPTO Advisory Action for U.S. Appl. No. 13/591,145 dated Jun. 13, 2013; 3 pages.
USPTO Advisory Action for U.S. Appl. No. 13/591,145 dated Jul. 9, 2013; 3 pages.
USPTO Advisory Action for U.S. Appl. No. 13/591,145 dated Dec. 6, 2013; 3 pages.
USPTO Final Rejection for U.S. Appl. No. 12/167,494 dated Mar. 15, 2011; 15pages.
USPTO Final Rejection for U.S. Appl. No. 12/167,494 dated May 30, 2012; 16pages.
USPTO Final Rejection for U.S. Appl. No. 12/844,798 dated Feb. 13, 2013; 19 pages.
USPTO Final Rejection for U.S. Appl. No. 12/844,798 dated Oct. 7, 2013; 24 pages.
USPTO Final Rejection for U.S. Appl. No. 12/844,798 dated Jun. 18, 2012, 21pages.
USPTO Final Rejection for U.S. Appl. No. 13/591,145 dated Apr. 3, 2013; 17 pages.
USPTO Final Rejection for U.S. Appl. No. 13/591,145 dated Oct. 3, 2013; 16 pages.
USPTO Final Rejection for U.S. Appl. No. 13/950,672 dated Jan. 2, 2014; 17 pages.
USPTO Non Final Rejection for U.S. Appl. No. 12/844,798 dated Feb. 4, 2014; 27 pages.
USPTO Non-Final Rejection for U.S. Appl. No. 12/167,494 dated Aug. 4, 2010; 12pages.
USPTO Non-Final Rejection for U.S. Appl. No. 12/167,494 dated Nov. 15, 2012; 20 pages.
USPTO Non-Final Rejection for U.S. Appl. No. 12/167,494 dated Nov. 30, 2011; 17 pages.
USPTO Non-Final Rejection for U.S. Appl. No. 12/844,798 dated Feb. 14, 2012; 18 pages.
USPTO Non-Final Rejection for U.S. Appl. No. 12/844,798 dated Jul. 11, 2013; 23 pages.
USPTO Non-Final Rejection for U.S. Appl. No. 13/591,145 dated Aug. 12, 2013; 16 pages.
USPTO Non-Final Rejection for U.S. Appl. No. 13/591,145 dated Oct. 17, 2012; 16 pages.
USPTO Non-Final Rejection for U.S. Appl. No. 13/950,672 dated Sep. 9, 2013; 17 pages.
USPTO Notice of Allowance for U.S. Appl. No. 12/167,494 dated Apr. 12, 2013; 9 pages.
USPTO Notice of Allowance for U.S. Appl. No. 12/167,494 dated May 31, 2013; 16 pages.
USPTO Notice of Allowance for U.S. Appl. No. 12/167,494 dated Jun. 24, 2013; 10 pages.
USPTO Notice of Allowance for U.S. Appl. No. 13/591,145 dated Jan. 6, 2014; 9 pages.
Written Opinion of the International Searching Authority for International Application No. PCT/US08/69108 dated Sep. 26, 2008; 4 pages.
Written Opinion of the International Searching Authority for International Application No. PCT/US10/43590 mailed Sep. 27, 2010; 5 pages.
Written Opinion of the International Searching Authority for International Application No. PCT/US12/64222 mailed Dec. 19, 2012; 7 pages.

* cited by examiner

PREDICTIVE TOUCH SURFACE SCANNING

RELATED APPLICATIONS

This application is a continuation in part of U.S. patent application Ser. No. 12/844,798, filed on Jul. 27, 2010, which claims priority to U.S. Provisional Application No. 61/229,236, filed on Jul. 28, 2009, all of which are hereby incorporated by reference.

TECHNICAL FIELD

This disclosure relates to the field of touch-sensors and, in particular, to performing measurement scans of capacitive touch-sensor arrays.

BACKGROUND

Computing devices, such as notebook computers, personal data assistants (PDAs), kiosks, and mobile handsets, have user interface devices, which are also known as human interface devices (HID). One user interface device that has become more common is a touch-sensor pad (also commonly referred to as a touchpad). A basic notebook computer touch-sensor pad emulates the function of a personal computer (PC) mouse. A touch-sensor pad is typically embedded into a PC notebook for built-in portability. A touch sensor pad replicates X/Y movement using a collection of capacitive sensor elements, arranged along two defined axes, that detect the presence or proximity of one or more conductive objects, such as a finger. Mouse right/left button clicks can be replicated by two mechanical or capacitive-sensed buttons, located in the vicinity of the touchpad, or by tapping commands on the touch-sensor pad itself. The touch-sensor pad provides a user interface device for performing such functions as positioning a pointer, or selecting an item on a display. These touch-sensor pads may include multi-dimensional sensor arrays for determining movement of the conductive object in multiple axes. The sensor array may include a one-dimensional sensor array, detecting movement in one axis. The sensor array may also be two dimensional, detecting movements in two axes.

Another user interface device that has become more common is a touch screen. Touch screens, also known as touchscreens, touch windows, touch panels, or touchscreen panels, are transparent display overlays which are typically either pressure-sensitive (resistive or piezoelectric), electrically-sensitive (capacitive), acoustically-sensitive (surface acoustic wave (SAW)) or photo-sensitive (infra-red). Such overlays allow a display to be used as an input device, removing the keyboard and/or the mouse as the primary input device for interacting with the displayed image's content. Such displays can be attached to computers or, as terminals, to networks. Touch screens have become familiar in retail settings, on point-of-sale systems, on ATMs, on mobile handsets, on kiosks, on game consoles, and on PDAs where a stylus is sometimes used to manipulate the graphical user interface (GUI) and to enter data. A user can touch a touch screen or a touch-sensor pad to manipulate data. For example, a user can apply a single touch, by using a finger to touch the surface of a touch screen, to select an item from a menu.

BRIEF DESCRIPTION OF THE DRAWINGS

The present disclosure is illustrated by way of example, and not by way of limitation, in the figures of the accompanying drawings.

DETAILED DESCRIPTION

Figure 1:
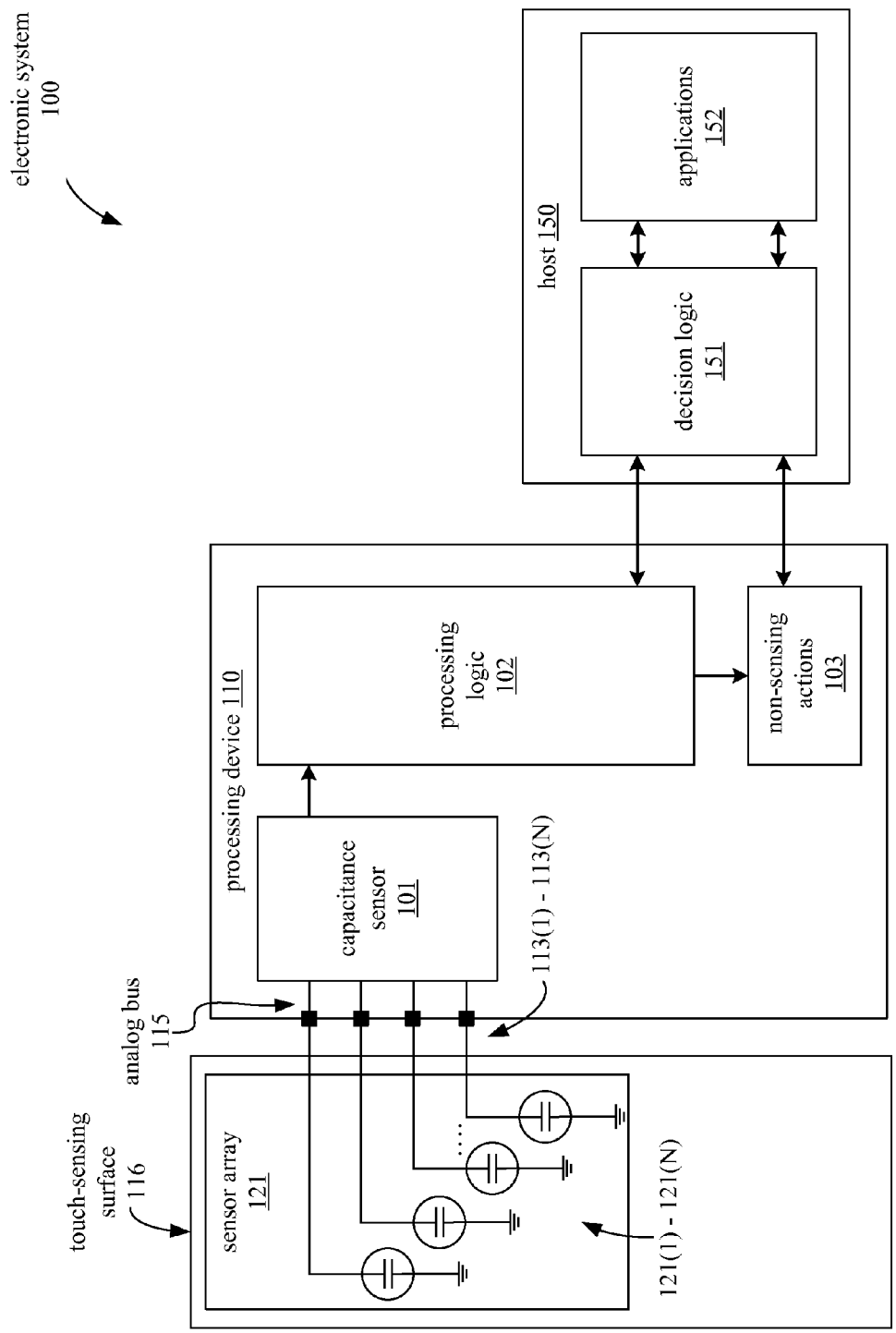
FIG. 1 is a block diagram illustrating an embodiment of an electronic system that processes touch sensor data.

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in a simple block diagram format in order to avoid unnecessarily obscuring the present invention. Thus, the specific details set forth are merely exemplary. Particular implementations may vary from these exemplary details and still be contemplated to be within the spirit and scope of the present invention.

In one embodiment, a capacitive touch-sensing surface may be used to track locations of one or more conductive objects in contact or in close proximity to the touch-sensing surface by scanning each of a number of intersections between capacitive sensor elements. In one embodiment, a touch may be detected at the touch-sensing surface when a conductive object, such as a finger, contacts or is in close proximity to the touch-sensing surface. An intersection between two sensor elements may be understood as a location at which one sensor element crosses over or overlaps another, while maintaining galvanic isolation from each other. A scan may include a series of mutual capacitance measurements between pairs of intersecting sensor elements spanning all or a portion of the touch-sensing surface. An embodiment of such a capacitive touch-sensing surface may decrease power consumption and increase noise immunity by limiting the number of intersections scanned for identifying a location of the conductive object. In one embodiment, limiting the number of scanned intersections may further increase accuracy, reduce response time, and improve refresh rate of the touch-sensing device.

In one embodiment, a processing device may perform a first scan of the touch-sensing surface to detect and resolve the location of a conductive object. Based on this resolved (i.e., calculated) location, the processing device may predict a location or a set of possible future locations for the conductive object. For example, the processing device may calculate an predicted location of the conductive object based on the last known or previously resolved locations of the conductive object, the velocity, the acceleration, or a mix thereof of the conductive object. Alternatively, the processing device may determine a search window including all or most of the locations that the conductive object is likely to be found during a subsequent scan. In one embodiment, the prediction may also be based on the duration between the first scan and the next subsequent scan. In one embodiment, the search window may be rectangular. In an alternative embodiment, the search window may be some other non-square or non-rectangular shape.

Having determined a search window associated with the predicted location of the conductive object, the processing device may invoke a scan of intersections within the search window, which may include intersections near the predicted location. The conductive object can thus be tracked over time by performing a series of local scans comprising the limited number of intersections where the conductive object is likely to be located. In the rare event that the location of conductive object cannot be accurately resolved using data from a local scan, additional intersections, up to or including the whole panel may be sensed in order to determine the location of the object with the desired accuracy.

FIG. 1 illustrates a block diagram of one embodiment of an electronic system 100 including a processing device 110 that may be configured to measure capacitances from a touch sensing surface 116 including a capacitive sensor array. In one embodiment, a multiplexer circuit may be used to connect a capacitive sensor 101 with a sensor element array 121. The electronic system 100 includes a touch-sensing surface 116 (e.g., a touchscreen, or a touch pad) coupled to the processing device 110, which is coupled to a host 150. In one embodiment, the touch-sensing surface 116 is a two-dimensional user interface that uses a sensor element array 121 to detect touches on the surface 116.

In one embodiment, the sensor element array 121 includes sensor elements 121(1)-121(N) (where N is a positive integer) that are disposed as a two-dimensional matrix (also referred to as an XY matrix). The sensor element array 121 is coupled to pins 113(1)-113(N) of the processing device 110 via one or more analog buses 115 transporting multiple signals. In this embodiment, each sensor element 121(1)-121(N) is represented as a capacitor.

In one embodiment, the capacitance sensor 101 may include a relaxation oscillator or other means to convert a capacitance into a measured value. The capacitance sensor 101 may also include a counter or timer to measure the oscillator output. The processing device 110 may further include software components to convert the count value (e.g., capacitance value) into a sensor element detection decision (also referred to as switch detection decision) or relative magnitude. It should be noted that there are various known methods for measuring capacitance, such as current versus voltage phase shift measurement, resistor-capacitor charge timing, capacitive bridge divider, charge transfer, successive approximation, sigma-delta modulators, charge-accumulation circuits, field effect, mutual capacitance, frequency shift, or other capacitance measurement algorithms. It should be noted however, instead of evaluating the raw counts relative to a threshold, the capacitance sensor 101 may be evaluating other measurements to determine the user interaction. For example, in the capacitance sensor 101 having a sigma-delta modulator, the capacitance sensor 101 is evaluating the ratio of pulse widths of the output (i.e., density domain), instead of the raw counts being over or under a certain threshold.

In one embodiment, the processing device 110 further includes processing logic 102. Operations of the processing logic 102 may be implemented in firmware; alternatively, it may be implemented in hardware or software. The processing logic 102 may receive signals from the capacitance sensor 101, and determine the state of the sensor element array 121, such as whether an object (e.g., a finger) is detected on or in proximity to the sensor element array 121 (e.g., determining the presence of the object), resolve where the object is on the sensor array (e.g., determining the location of the object), tracking the motion of the object, or other information related to an object detected at the touch sensor.

In another embodiment, instead of performing the operations of the processing logic 102 in the processing device 110, the processing device 110 may send the raw data or partially-processed data to the host 150. The host 150, as illustrated in FIG. 1, may include decision logic 151 that performs some or all of the operations of the processing logic 102. Operations of the decision logic 151 may be implemented in firmware, hardware, software, or a combination thereof. The host 150 may include a high-level Application Programming Interface (API) in applications 152 that perform routines on the received data, such as compensating for sensitivity differences, other compensation algorithms, baseline update routines, start-up and/or initialization routines, interpolation operations, or scaling operations. The operations described with respect to the processing logic 102 may be implemented in the decision logic 151, the applications 152, or in other hardware, software, and/or firmware external to the processing device 110. In some other embodiments, the processing device 110 is the host 150.

In another embodiment, the processing device 110 may also include a non-sensing actions block 103. This block 103 may be used to process and/or receive/transmit data to and from the host 150. For example, additional components may be implemented to operate with the processing device 110 along with the sensor element array 121 (e.g., keyboard, keypad, mouse, trackball, LEDs, displays, or other peripheral devices).

The processing device 110 may reside on a common carrier substrate such as, for example, an integrated circuit (IC) die substrate, or a multi-chip module substrate. Alternatively, the components of the processing device 110 may be one or more separate integrated circuits and/or discrete components. In one embodiment, the processing device 110 may be the Programmable System on a Chip (PSoC™) processing device, developed by Cypress Semiconductor Corporation, San Jose, Calif. Alternatively, the processing device 110 may be one or more other processing devices known by those of ordinary skill in the art, such as a microprocessor or central processing unit, a controller, special-purpose processor, digital signal processor (DSP), an application specific integrated circuit (ASIC), a field programmable gate array (FPGA), or other programmable device. In an alternative embodiment, for example, the processing device 110 may be a network processor having multiple processors including a core unit and multiple micro-engines. Additionally, the processing device 110 may include any combination of general-purpose processing device(s) and special-purpose processing device(s).

In one embodiment, the electronic system 100 is implemented in a device that includes the touch-sensing surface 116 as the user interface, such as handheld electronics, portable telephones, cellular telephones, notebook computers, personal computers, personal data assistants (PDAs), kiosks, keyboards, televisions, remote controls, monitors, handheld multi-media devices, handheld video players, gaming devices, control panels of a household or industrial appliances, or other computer peripheral or input devices. Alternatively, the electronic system 100 may be used in other types of devices. It should be noted that the components of electronic system 100 may include all the components described above. Alternatively, electronic system 100 may include only some of the components described above, or include additional components not listed herein.

Figure 2:
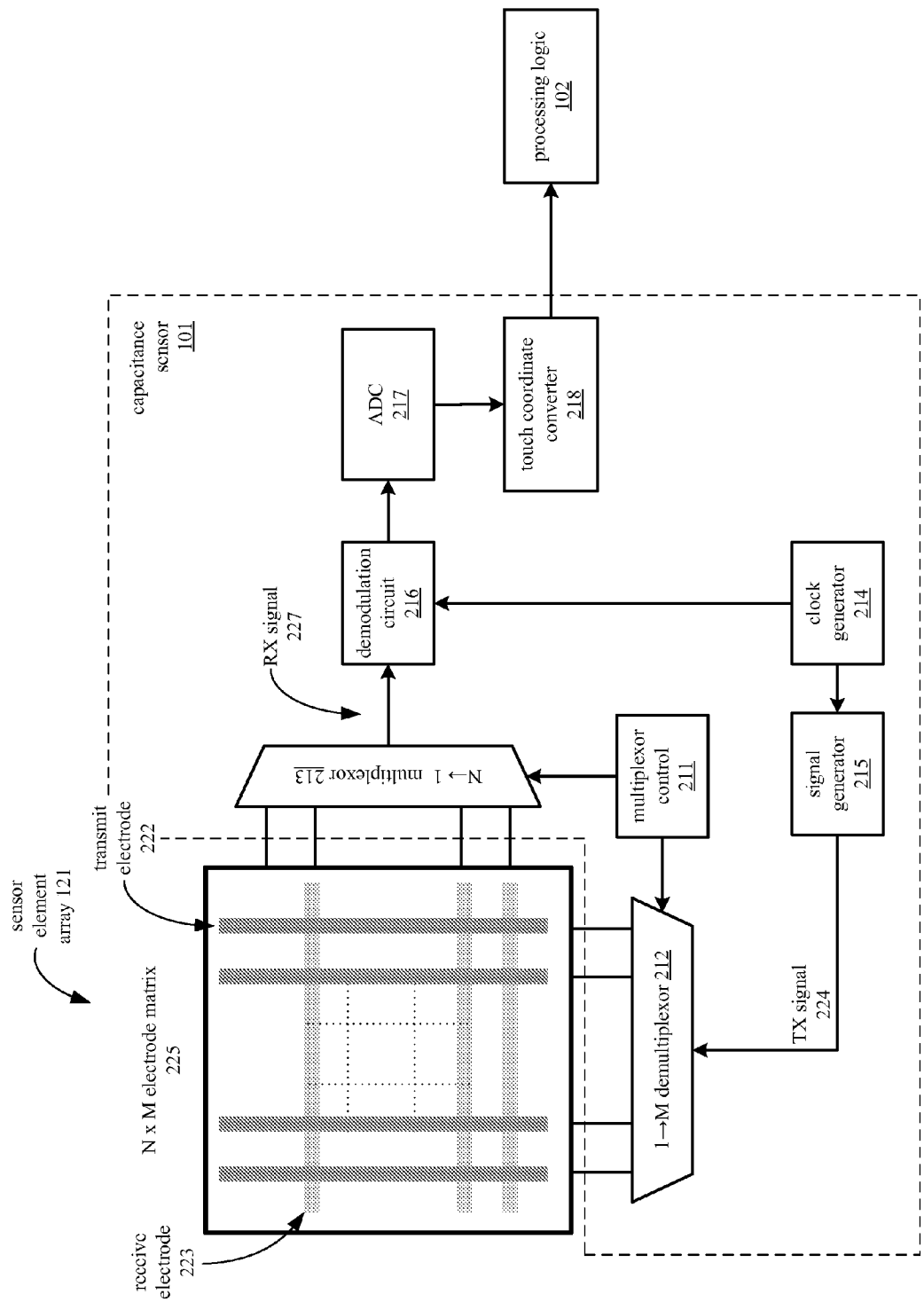
FIG. 2 is a block diagram illustrating an embodiment of an electronic system that processes touch sensor data.

FIG. 2 is a block diagram illustrating one embodiment of an array of capacitive touch sensor elements 121 and a capacitance sensor 101 that converts changes in measured capacitances to coordinates indicating the presence and location of touch. The coordinates are calculated based on changes in measured capacitances relative to the capacitances of the same touch sensor element array 121 in an un-touched state. In one embodiment, sensor element array 121 and capacitance sensor 101 are implemented in a system such as electronic system 100. Sensor element array 121 includes a matrix 225 of N×M electrodes (N receive electrodes and M transmit electrodes), which further includes transmit (TX) electrode 222 and receive (RX) electrode 223. Each of the electrodes in matrix 225 is connected with capacitance sensing circuit 101 through demultiplexer 212 and multiplexer 213.

Capacitance sensor 101 includes multiplexer control 211, demultiplexer 212 and multiplexer 213, clock generator 214, signal generator 215, demodulation circuit 216, and analog to digital converter (ADC) 217. ADC 217 is further coupled with touch coordinate converter 218. Touch coordinate converter 218 may be implemented in the processing logic 102.

The transmit and receive electrodes in the electrode matrix 225 may be arranged so that each of the transmit electrodes overlap and cross each of the receive electrodes such as to form an array of intersections, while maintaining galvanic isolation from each other. Thus, each transmit electrode may be capacitively coupled with each of the receive electrodes. For example, transmit electrode 222 is capacitively coupled with receive electrode 223 at the point where transmit electrode 222 and receive electrode 223 overlap.

Clock generator 214 supplies a clock signal to signal generator 215, which produces a TX signal 224 to be supplied to the transmit electrodes of touch sensor 121. In one embodiment, the signal generator 215 includes a set of switches that operate according to the clock signal from clock generator 214. The switches may generate a TX signal 224 by periodically connecting the output of signal generator 215 to a first voltage and then to a second voltage, wherein said first and second voltages are different.

The output of signal generator 215 is connected with demultiplexer 212, which allows the TX signal 224 to be applied to any of the M transmit electrodes of touch sensor 121. In one embodiment, multiplexer control 211 controls demultiplexer 212 so that the TX signal 224 is applied to each transmit electrode 222 in a controlled sequence. Demultiplexer 212 may also be used to ground, float, or connect an alternate signal to the other transmit electrodes to which the TX signal 224 is not currently being applied. In an alternate embodiment the TX signal 224 may be presented in a true form to a subset of the transmit electrodes 222 and in complement form to a second subset of the transmit electrodes 222, wherein there is no overlap in members of the first and second subset of transmit electrodes 222.

Because of the capacitive coupling between the transmit and receive electrodes, the TX signal 224 applied to each transmit electrode induces a current within each of the receive electrodes. For instance, when the TX signal 224 is applied to transmit electrode 222 through demultiplexer 212, the TX signal 224 induces an RX signal 227 on the receive electrodes in matrix 225. The RX signal 227 on each of the receive electrodes can then be measured in sequence by using multiplexer 213 to connect each of the N receive electrodes to demodulation circuit 216 in sequence.

The mutual capacitance associated with each intersection between a TX electrode and an RX electrode can be sensed by selecting every available combination of TX electrode and an RX electrode using demultiplexer 212 and multiplexer 213. To improve performance, multiplexer 213 may also be segmented to allow more than one of the receive electrodes in matrix 225 to be routed to additional demodulation circuits 216. In an optimized configuration, wherein there is a 1-to-1 correspondence of instances of demodulation circuit 216 with receive electrodes, multiplexer 213 may not be present in the system.

When a conductive object, such as a finger, approaches the electrode matrix 225, the object causes a decrease in the measured mutual capacitance between only some of the electrodes. For example, if a finger is placed near the intersection of transmit electrode 222 and receive electrode 223, the presence of the finger will decrease the charge coupled between electrodes 222 and 223. Thus, the location of the finger on the touchpad can be determined by identifying the one or more receive electrodes having a decrease in measured mutual capacitance in addition to identifying the transmit electrode to which the TX signal 224 was applied at the time the decrease in capacitance was measured on the one or more receive electrodes.

By determining the mutual capacitances associated with each intersection of electrodes in the matrix 225, the presence and locations of one or more conductive objects may be determined. The determination may be sequential, in parallel, or may occur more frequently at commonly used electrodes.

In alternative embodiments, other methods for detecting the presence of a finger or other conductive object may be used where the finger or conductive object causes an increase in measured capacitance at one or more electrodes, which may be arranged in a grid or other pattern. For example, a finger placed near an electrode of a capacitive sensor may introduce an additional capacitance to ground that increases the total capacitance between the electrode and ground. The location of the finger can be determined based on the locations of one or more electrodes at which a change in measured capacitance is detected, and the associated magnitude of capacitance change at each respective electrode.

The induced current signal 227 is integrated by demodulation circuit 216. The rectified current output by demodulation circuit 216 can then be filtered and converted to a digital code by ADC 217.

A series of such digital codes measured from adjacent sensor intersections, when compared to or offset by the associated codes of these same sensors in an un-touched state, may be converted to touch coordinates indicating a position of an input on touch sensor element array 121 by touch coordinate converter 218. The touch coordinates may then be used to detect gestures or perform other functions by the processing logic 102.

Figure 3:
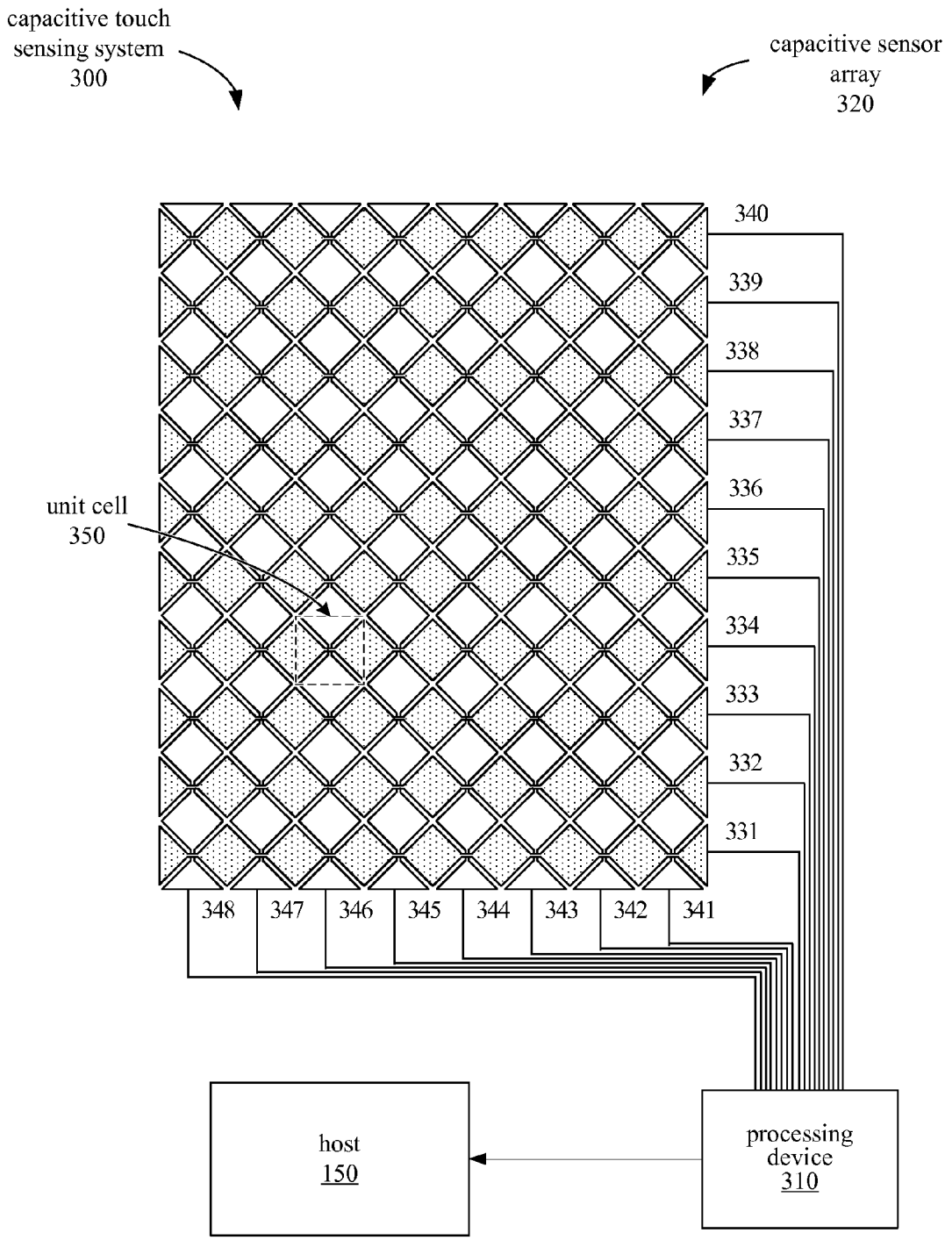
FIG. 3 illustrates an embodiment of a capacitive sensor array having a diamond pattern.

FIG. 3 illustrates an embodiment of a capacitive touch sensing system 300 that includes a capacitive sensor array 320. Capacitive sensor array 320 includes a plurality of row electrodes 331-340 and a plurality of column electrodes 341-348. The row and column electrodes 331-348 are connected to a processing device 310, which may include the functionality of capacitance sensor 101, as illustrated in FIG. 2. In one embodiment, the processing device 310 may perform mutual capacitance measurement scans of the capacitive sensor array 320 to measure a mutual capacitance value associated with each of the intersections between a row electrode and a column electrode in the sensor array 320. The measured capacitances may be further processed to determine centroid locations of one or more contacts of conductive objects proximate to the capacitive sensor array 320.

In one embodiment, the processing device 310 is connected to a host 150 which may receive the measured capacitances or calculated centroid locations from the processing device 310.

The sensor array 320 illustrated in FIG. 3 includes sensor electrodes arranged to create a pattern of interconnected diamond shapes. Specifically, the sensor electrodes 331-348 of sensor array 320 form a single solid diamond (SSD) pattern. In one embodiment, each intersection between a row electrode and a column electrode defines a unit cell. Each point within the unit cell is closer to the associated intersection than to any other intersection. For example, unit cell 350 contains the points that are closest to the intersection between row electrode 334 and column electrode 346.

In one embodiment, a capacitive touch-sensing system may collect data from the entire touch-sensing surface by performing a scan to measure capacitances from the unit cells that comprise the touch-sensing surface, then process the data serially or in parallel with a subsequent scan. For example, one system that processes data serially may collect raw capacitance data from each unit cell of the entire touch-sensing surface, and filter the raw data. Based on the filtered raw data, the system may determine local maxima in the measured changes in capacitance to calculate positions of fingers or other conductive objects, then perform post processing of the resolved positions to report locations of the conductive objects, or to perform other functions such as motion tracking or gesture recognition.

In one embodiment, a touch-sensing system may be configured to perform one or both of self-capacitance sensing and mutual capacitance sensing. One embodiment of a capacitive touch-sensing system that is configured to perform self-capacitance sensing may sequentially measure the self capacitance of each row and column sensor element of the touch-sensing surface, such that the total number of sense operations is N+M, for a capacitive sensor array having N rows and M columns. In one embodiment, the touch-sensing system may be capable of connecting individual sensor elements together to be sensed in parallel with a single operation. For example, multiple row and or column sensor element may be coupled together and sensed in a single operation to determine whether a conductive object is touching or near the touch-sensing surface.

In one embodiment, a touch-sensing system may perform mutual capacitance sensing by individually sensing each intersection between a row electrode and a column sensor electrode. Thus, a total number of sense operations for a capacitive touch sensor having X rows and Y columns is X×Y. In one embodiment, performing a mutual capacitance measurement of a unit cell formed at the intersection of a row electrode and a column electrode includes applying a signal (TX) to one electrode and measuring characteristics of the signal on another electrode resulting from the capacitive coupling between the electrodes.

In one embodiment, multiple capacitance sensing circuits may be used in parallel to measure a signal coupled to multiple column electrodes simultaneously, from a signal applied to one or more row electrodes. In one embodiment, for a capacitive sensor array having X rows, Y columns, and N columns that can be sensed simultaneously, the number of mutual capacitance sensing operations is the smallest whole number greater than or equal to X×Y/N.

The power consumption of a self-capacitance or mutual capacitance touch-sensing system may be decreased by limiting scans to a portion of the touch-sensing surface. Limiting the scan may further result in higher immunity from noise, as well as higher accuracy, response time, and refresh rate when tracking a conductive object.

As an example, a touch-sensing system may have X=16 rows, Y=24 columns, and N=8 columns that can be sensed simultaneously. Such a touch-sensing system, when configured to measure an 8×8 block of unit cells as a search window, may track a presence and location of a conductive object using 8 sensing operations per scan. The same system performing a scan of the entire touch-sensing surface would use 48 sensing operations per update. Thus, in this particular example, local scanning results in a 6× improvement in scan time and similar reduction in power to perform the scan.

In one embodiment, a 5.5 inch diagonal panel composed of >700 unit cells, using a 7×7 search window may reduce scanning time by a factor of 15, as compared to a full scan. This reduced scanning speed may further affect many of the critical parameters of a touchscreen system, such as power consumption, signal to noise ratio, refresh rate, and accuracy.

Figure 4:
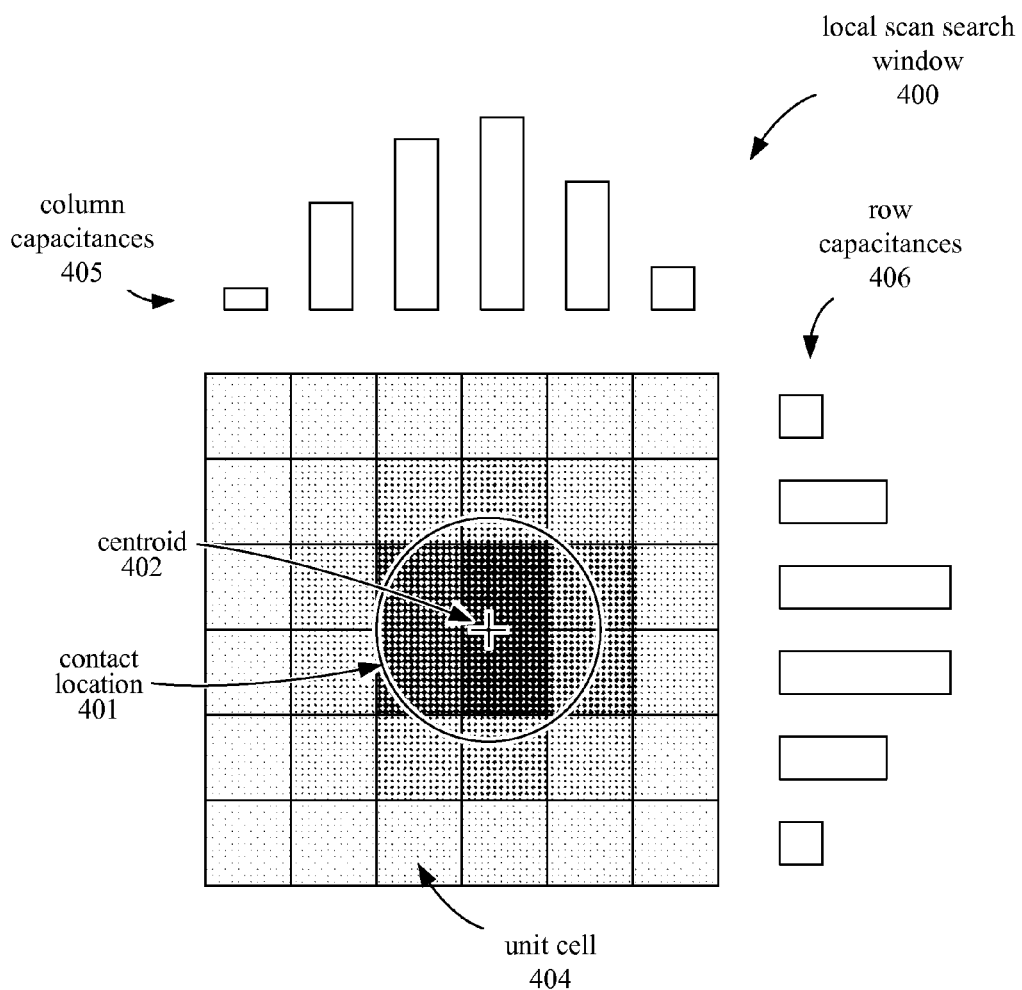
FIG. 4 illustrates unit cells of a capacitive sensor array, according to an embodiment.

FIG. 4 illustrates a 6×6 grid of unit cells representing a portion of a capacitive sensor array, according to an embodiment. The illustrated grid includes unit cells of sensor elements that are affected by a contact or proximity of a conductive object. In one embodiment, each of the unit cells, such as unit cell 404, corresponds to an intersection between a row and column electrode in a capacitive sensor array. In FIG. 4, the shading of each unit cell indicates a magnitude of a change in mutual capacitance for that unit cell resulting from the presence of a conductive object at a contact location 401, with darker shading indicating a greater change in capacitance. In one embodiment, the location of contact 401 is determined by a centroid 402 calculated based on an array populated with the sensed capacitance values of each of the intersections within the local search window. In one embodiment, the contact location's centroid 402 is calculated using interpolation between all the measured capacitance values in each of the X and Y directions, and by using most or all of the readings which are exceed a noise threshold. By this method, the center of a contact by or presence of a conductive object can be calculated with much finer resolution than the pitch of electrodes used to make the sensor grid. In another embodiment, only a subset of the measured capacitance values is used for the calculation.

In one embodiment, a size of a search window over which a touch-sensing system may perform a local scan may be determined based on an expected maximum velocity of a finger or other conductive object to be tracked by the touch-sensing system. For example, a capacitive sensor array may have an electrode pitch of 5 mm and may be scanned at a rate of 100 Hz. For a touch-sensing application, a finger on a touchscreen may move as fast as 1 meter per second over the sensor array, with speeds much faster than a few hundred millimeters per second being relatively uncommon.

In such a touch-sensing system, it will be unusual for a finger to have moved more than a few millimeters during a time interval between scans. Thus, the search window may be sized to include substantially all of the predicted locations of the conductive object, given the expected rate of travel of the conductive object. For example, the local scan may include all or a subset of the intersections within an 8×8 area of unit cells, which would be large enough to accommodate the maximum expected travel distance for the finger or other conductive object of a few millimeters per scan interval if the local scan window were centered on the centroid of the resolved touch in the previous scan.

In one embodiment, a touch-sensing system may determine a location of the search window over which to perform a local scan based on a predicted location of a conductive object, such as a finger. For example, the system may predict a location where a finger is expected to be during the time of a subsequent scan and perform a local scan including intersections of sensor elements around the predicted location. In one embodiment, the system identifies a search window, which is an area including intersections to be scanned during the local scan. In one embodiment, the search window includes the predicted location of the conductive object. In one embodiment the predicted location of the conductive object is the calculated location of the conductive object from the previous scan.

In one embodiment, the touch-sensing system uses the location of the conductive object, as determined by an initial scan, as the predicted location of the conductive object for a subsequent local scan. In one embodiment, the touch-sensing system may also account for the velocity or acceleration of a conductive object that is in motion. For example, the system may determine the last known position, velocity, and acceleration of the conductive object based on previously resolved positions of the conductive object in order to calculate a predicted location for the conductive object at a time when the subsequent local scan is scheduled to be performed.

In one embodiment, a process for locating a contact using a local scan begins by predicting a contact location. In one embodiment, a touch-sensing system may operate based on assuming that the contact point of a conductive object proximate to the touch-sensing surface is moving sufficiently slowly that the last known location of the contact can be used to approximate the predicted location of the contact for a subsequent scan.

In one embodiment, the suitability of using the last known contact location as an predicted location may depend on factors including the scanning rate of the touch-sensing system, the size of the sensor elements, the expected maximum velocity of the conductive object, and the size of the search window.

For example, for a touch-sensing panel that is scanned at 200 Hz with a unit cell size of 5×5 mm, would still be able to locate a conductive object, such as a finger, moving at 200 Hz×5 mm=1 m/s using a search window that includes a border that is at least one additional "buffer" unit cell wide on all sides of the minimum area for determining the centroid location of the contact. For example, if the touch-sensing system uses minimum of a 6×6 grid of unit cells to calculate the centroid location of the conductive object, the size of the search window would be 8×8 unit cells.

In an alternative embodiment, the predicted location of the conductive object may be predicted based on previously determined locations of the contact location. In one embodiment, the previous locations of the contact may be used to calculate a velocity and acceleration of the contact. Calculation of the predicted contact location based on velocity may increase the accuracy of the prediction, particularly for a contact moving at a substantially constant rate. Compensating for acceleration of the moving contact may further increase the prediction accuracy for contacts that are not moving at a constant velocity.

Figure 5:
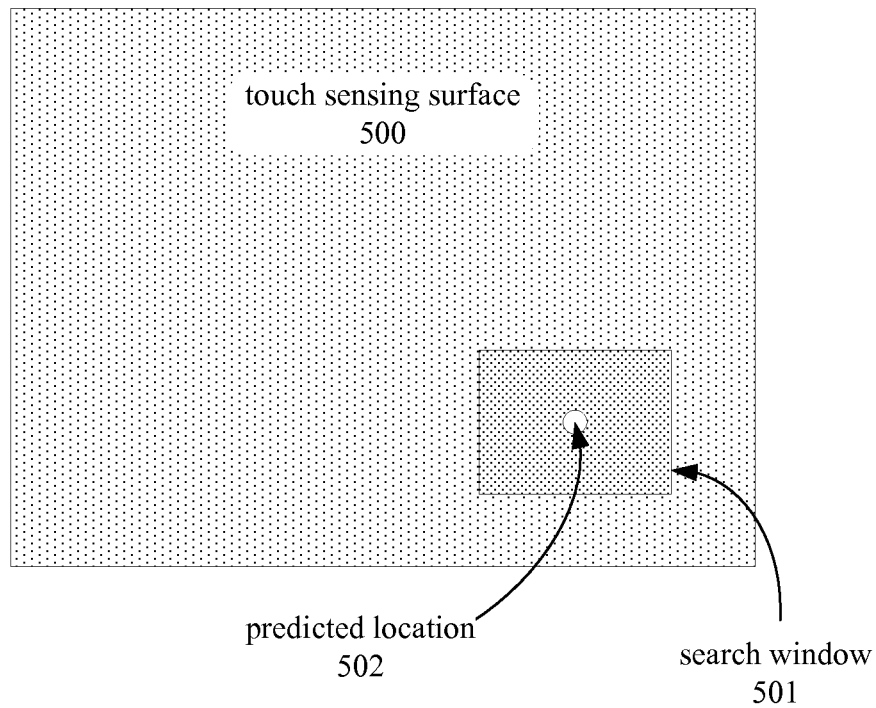
FIG. 5 illustrates an area of a touch-sensing surface, according to an embodiment.

FIG. 5 illustrates an area of a touch-sensing surface 500, according to an embodiment. As illustrated in FIG. 5, a search window 501 may cover a portion of the touch-sensing surface 500, and may be positioned such that the search window 501 contains the predicted location 502 for the conductive object. In one embodiment, the search window 501 may be centered to surround the predicted location 502.

Figure 6A:
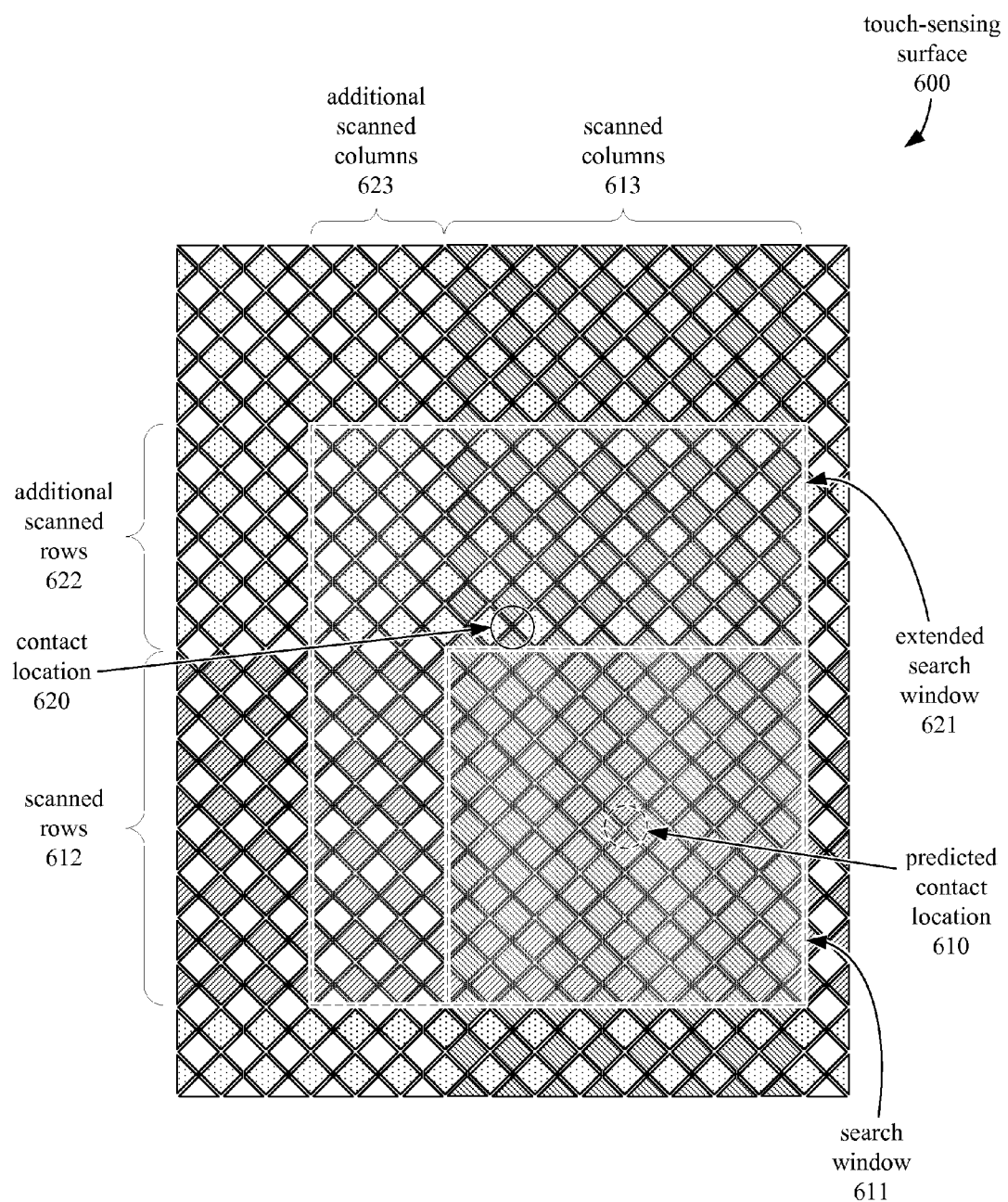
FIG. 6A illustrates a search window of a touch-sensing surface, according to an embodiment.

FIG. 6A illustrates a search window 611 of a touch-sensing surface 600, according to an embodiment. In one embodiment, one or more preceding touch contacts have been resolved to allow prediction of a contact location 610. In one embodiment, once the touch-sensing system has predicted a location 610, the touch-sensing system may perform self-capacitance or mutual capacitance measurements on sensor elements intersecting with other sensor elements within the search window 611. In one embodiment, the predicted contact location 610 is at the center of search window 611.

In one embodiment, the touch-sensing system scans the intersections within the search window 611 by performing capacitance measurements using the rows 612 and columns 613, the result of such measurements used to resolve a location of the conductive object within the search window 611. In one embodiment, the capacitance measurements may be mutual capacitance measurements between individual row and column sensor elements. Alternatively, the touch-sensing system may perform a self-capacitance scan of each of the rows 612 and columns 613 to determine a detected location of the conductive object within the search window 611. For example, a self-capacitance scan of local scan search window 400 may result in a self-capacitance profile including column capacitances 405 and row capacitances 406.

Capacitance measurements collected from scanning the search window 611 may be analyzed to determine whether a presence of a finger or other conductive object has been detected within the search area 611. In one embodiment, if a contact is detected wholly within the search area 611, the touch-sensing system may proceed with resolving a location of the conductive object based on the capacitance measurements. In one embodiment, a location can be resolved based on a minimum number of capacitance measurements. Thus, a location of a conductive object that is completely within the search window is resolvable using only capacitance measurements of sensor elements that intersect within the search window. In contrast, a contact that is only partially within the search window may be resolved using the capacitance measurements of sensor elements intersecting within the search window 611, in addition to capacitance measurements of sensor elements intersecting outside the search window 611. In one embodiment, a contact may be detected to be only partially (i.e., not wholly) within the search window if the highest (or lowest) capacitance value in either the X or Y direction is within a predetermined number of intersections of the edge of the search window. In another embodiment, a contact may be determined to be only partially within the search window if the measured capacitance value at one or more (or another predetermined number) of the intersections forming the boundary of the search window differs more than a predetermined amount from a reference level; this predetermined level may be an absolute capacitance value, or may be a value relative to the highest or lowest capacitance value measured within the search window.

For example, a contact at location 610 may be completely within the search window 611, while a contact at location 620 may be partially within the search window 611. Notably, although the contact location 620 is centered outside of the search window 611, a contact at location 620 may still cause changes in capacitance measurable at some intersections inside the search window 611.

In response to determining that the contact location is partially or completely outside the search window 611, the touch-sensing system may expand the size of the search window 611 by scanning additional sensor elements, such as columns 623 and rows 622. Thus, the initial search window 611 may be expanded to the extended search window 621. Note that it in some embodiments it may not be possible to distinguish between a touch having moved outside the search window and the conductive object having moved away from proximity to the touch sensing surface. However, in one embodiment the system responds in the same way—by expanding the size of the search window. In one embodiment the search window may be increased to cover the entire touch sensing surface. If no touch is detected within the expanded search window then it may be inferred that the conductive object has moved away from proximity to the sensing surface.

For example, a finger may be proximate to the touch-sensing surface 600 at a touch location 620 even after the touch-sensing system has predicted a location 610 based on previously determined locations of the finger. In one embodiment, this situation may arise when the finger is removed and replaced on the touch-panel or has moved faster than can be accommodated by the prediction method.

In one embodiment, the touch-sensing system may extend the search window 611 by the same number of sensor electrodes in each direction. For example, an extended search window may include the initial search window and one additional sensor electrode on each of the four sides of the initial search window. Alternatively, the touch-sensing system may extend the search window 611 in a direction depending on the capacitances measured from within the search window 611, or a direction of travel of the contact.

In one embodiment, the touch-sensing system may extend the initial search window on the same side as the strongest capacitance signals measured from the initial search window. This process accommodates situations where a contact location 620 is partially within the initial search window 611, or at least causes measurable changes in capacitance at the intersections within the search window 611. In one embodiment, the search window 611 may be extended until a minimum sufficient amount of capacitance data for resolving the contact location is collected.

In one embodiment, the touch-sensing surface may extend the search window 611 in the same direction as a direction of travel of the contact. For example, the touch-sensing system may extend the search window 611 upwards and to the left (with reference to FIG. 6A) to find the position of a contact that is traveling from location 610 to location 620, in response to determining that the contact is not completely within the search window 611.

In one embodiment, if a touch-sensing system is not able to detect a presence of a contact based on a local scan limited to a search window, the touch-sensing system may extend the search to scan the entire capacitive sensor array. Thus, the touch-sensing system may be able to locate the contact even if the contact travels completely outside the search window, such that the conductive object does not affect any capacitance measurements within the search window 611.

In one embodiment, a touch-sensing system implementing the local scan method may also be configured to detect the presence of additional conductive objects while tracking an initial contact using the local scan method, to allow local scanning to be used with multi-touch applications. There are several methods that can be used to detect new contacts, including detecting a change in the total self-capacitance of the capacitive sensor array, or scanning all or part of the sensor array using self or mutual capacitance sensing methods.

In one embodiment, a touch-sensing system may perform a scan of the remaining area of the touch-sensing surface, in addition to the area of the local scan, in order to detect the presence of additional conductive objects, such as additional fingers proximate to the touch-sensing surface.

In one embodiment, a quick detection of a new contact at the touch-sensing surface may be performed using a single self-capacitance measurement of the entire sensor, which may be performed in a single processing cycle. In one embodiment, when there is no touch location currently being tracked, the detecting the presence of a new touch may include a self-capacitance sensing of sensor elements of only one axis. Once a touch is detected, then that touch can be localized and verified to be a single touch by a self-capacitance measurement of the second axis. If more than one touch is present, then one or more fine scans using mutual capacitance may be used to resolve the locations of the individual touches. In one embodiment where the self capacitance measurements are of low resolution to only perform reliable detection of touch presence, resolution of touch location may always be performed using mutual capacitance fine scans.

In one embodiment, the sensor array may be sensed in sections to detect a new contact by electrically coupling sensor elements to make up such sections. For example, a touch-sensing system may sense three overlapping sections of a capacitive sensor array, with each section covering approximately half the area of the entire capacitive sensor array. In one embodiment, a touch-sensing system with overlapping sections may more easily detect the presence of a conductive object in an overlapping area, particularly when the change in measured capacitance caused by the conductive object is relatively small. In an alternative embodiment, the sections may be adjacent, but non-overlapping. For systems having a capacitance sensor with multiple sensing channels, the self-capacitance of all row and column sense electrodes can all be measured in parallel, wherein each sense electrode may be connected to a separate sensing channel.

In one embodiment, the touch-sensing system may detect the presence of additional contacts by scanning all or part of the capacitive sensor array using mutual-capacitance sensing methods. Depending on the ratio of sensor pitch to a minimum expected contact size, the intersections of the sensor electrodes may be sensed according to various patterns, such as striped or checkerboard patterns. In one embodiment, the touch-sensing system may sense intersections associated with alternate rows and columns to detect the presence of a contact. Alternatively, a touch-sensing system may sense intersections associated with every third row and column to detect the contact.

Figure 6B:
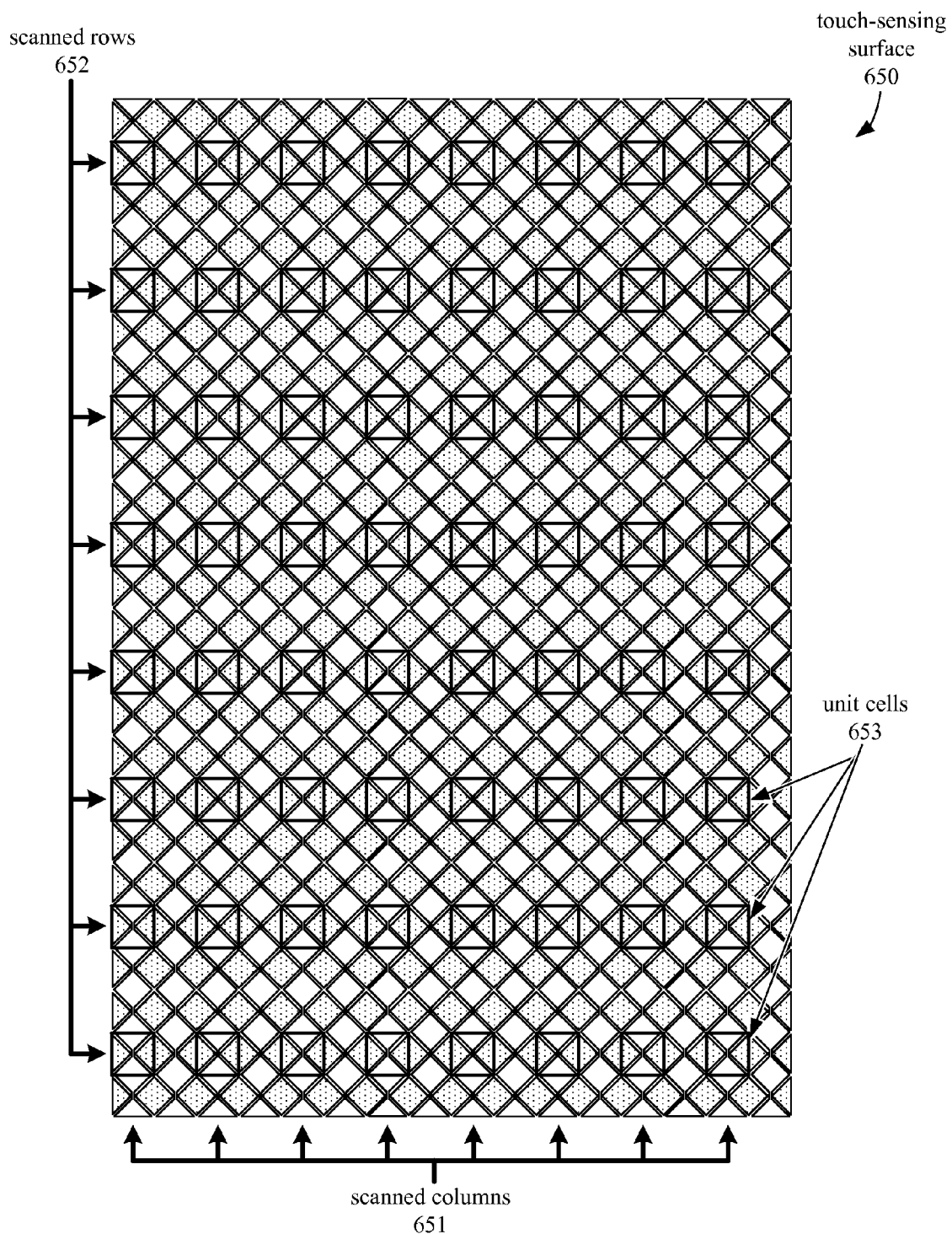
FIG. 6B illustrates a touch-sensing surface, according to an embodiment.

For example, FIG. 6B illustrates an embodiment of a touch-sensing surface 650 including a 16×24 sensor array with N=8. A touch-sensing system may detect a contact at the touch-sensing surface 650 by performing a self or mutual capacitance scan that includes scanning one of every three rows (rows 652) in conjunction with alternating columns (columns 651). Mutual capacitance measurements are thus performed for the unit cells (including unit cells 653) at the intersections of the scanned rows 652 and columns 651. Alternatively, the touch-sensing system may apply a TX signal to multiple rows simultaneously. In one embodiment, these rows may be interleaved with unsensed rows.

In one embodiment, a scan for new contacts may be performed at a lower rate than a tracking of a known contact using a local scanning method. In one embodiment, a scan of the entire sensor array to detect a new contact may be performed over several local scan periods. For example, a touch-sensing system may perform a self-capacitance scan of each of three sections, where one section is scanned for new contacts after every local scan for tracking a known contact. In such a case, with a 200 Hz update rate for local scan tracking, the typical "touch latency" for detecting a new contact would be approximately 15 ms to 20 ms.

In one embodiment where new contacts are detected using mutual capacitance measurements, the mutual capacitance scan for new contacts may be interleaved between a series of local tracking scans. For example, if 12 mutual capacitance sensing operations (corresponding to alternating rows and columns and N=8 channels and measuring 48 independent intersections) are used to find new contacts over the full area of the touch-sensing surface, then three rows may be sensed for each local scan, resulting in a 20 ms typical latency for detecting new contacts. Note that when performing these new contact scans, in one embodiment the area already covered by a local scan may be excluded since it has already been measured.

Figure 6C:
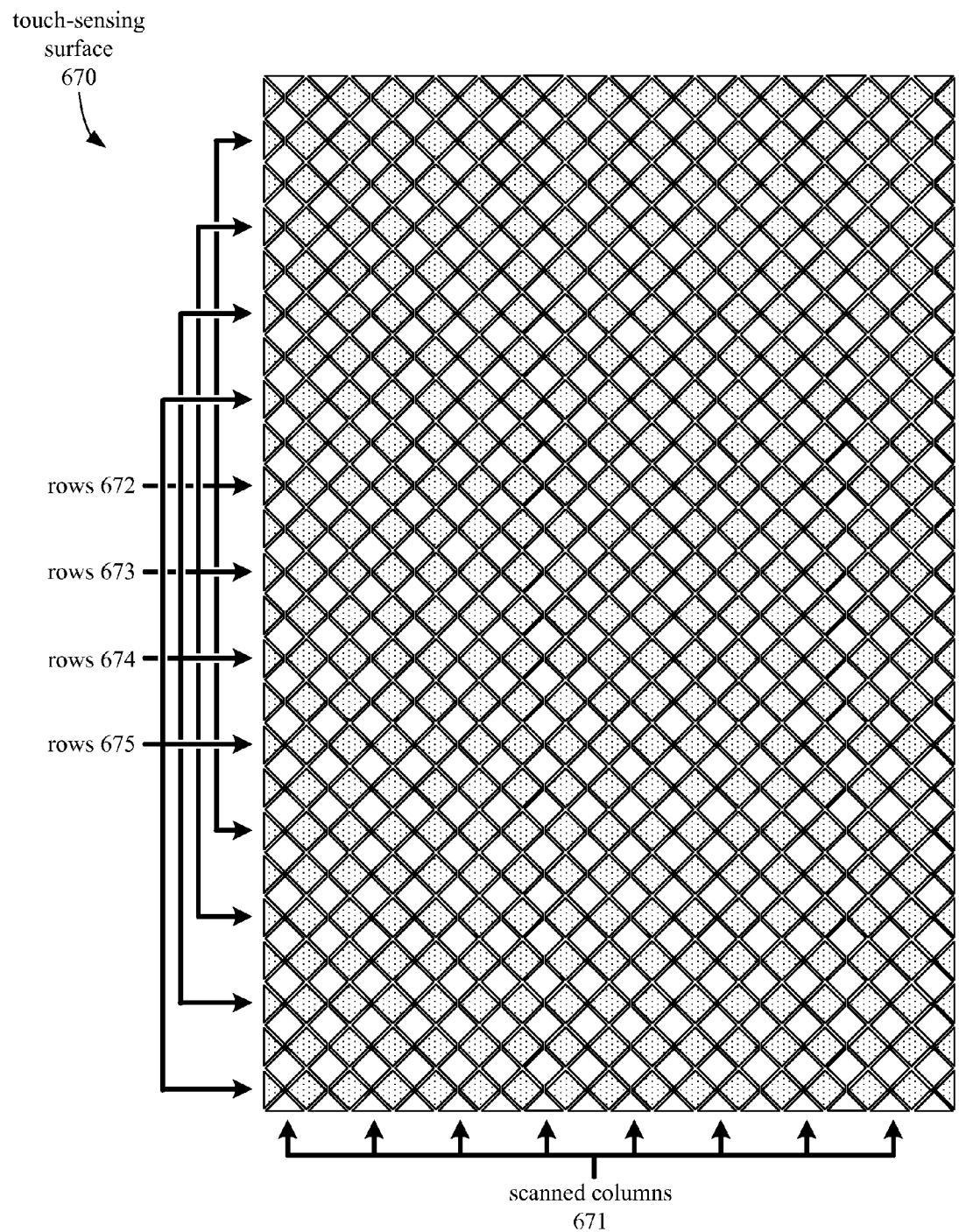
FIG. 6C illustrates a touch-sensing surface, according to an embodiment.

FIG. 6C illustrates an embodiment of a touch-sensing surface 670 with a 16×24 capacitive sensor array and N=8 channels, for which a set 671 of 8 columns of the 16 columns can be sensed simultaneously, with alternate rows being driven for a total of 8×12=96 capacitance measurements. In one embodiment, some of the rows may be driven with a true TX signal, while others are driven with a complement TX signal. The 12 rows being driven may be driven in four sets of 3, such that the first set 672, second set 673, third set 674, and fourth set 675 of 3 row elements are driven in sequence after a first, second, third, and fourth local scan, respectively. In one embodiment, intersections corresponding to all 3 of the interleaved rows in each set 672-675 may be sensed together by driving all 3 rows simultaneously, thus reducing the new touch detection operation to a single mutual capacitance operation for each local scan.

In one embodiment, the local scanning method is used only when tracking the location of a single conductive object in contact with or proximate to the touch-sensing surface. Alternatively, the local scanning method may be used to track a number of proximate conductive objects, such as finger touches.

In one embodiment, the system may use the local scan method for tracking a limited number of touches in a system that is capable of tracking more than the limited number of contacts. For example, a touch-sensing system capable of tracking up to ten contacts may use the local scan mode when tracking up to two simultaneous contacts at the touch-sensing surface, and may switch to a different mode for tracking more than two contacts. In this example, two separate search windows may be used when tracking two fingers. In one embodiment, if the two search windows overlap, a single larger window may be used for as long as the two centroids are within a predetermined distance of each other.

Figure 7:
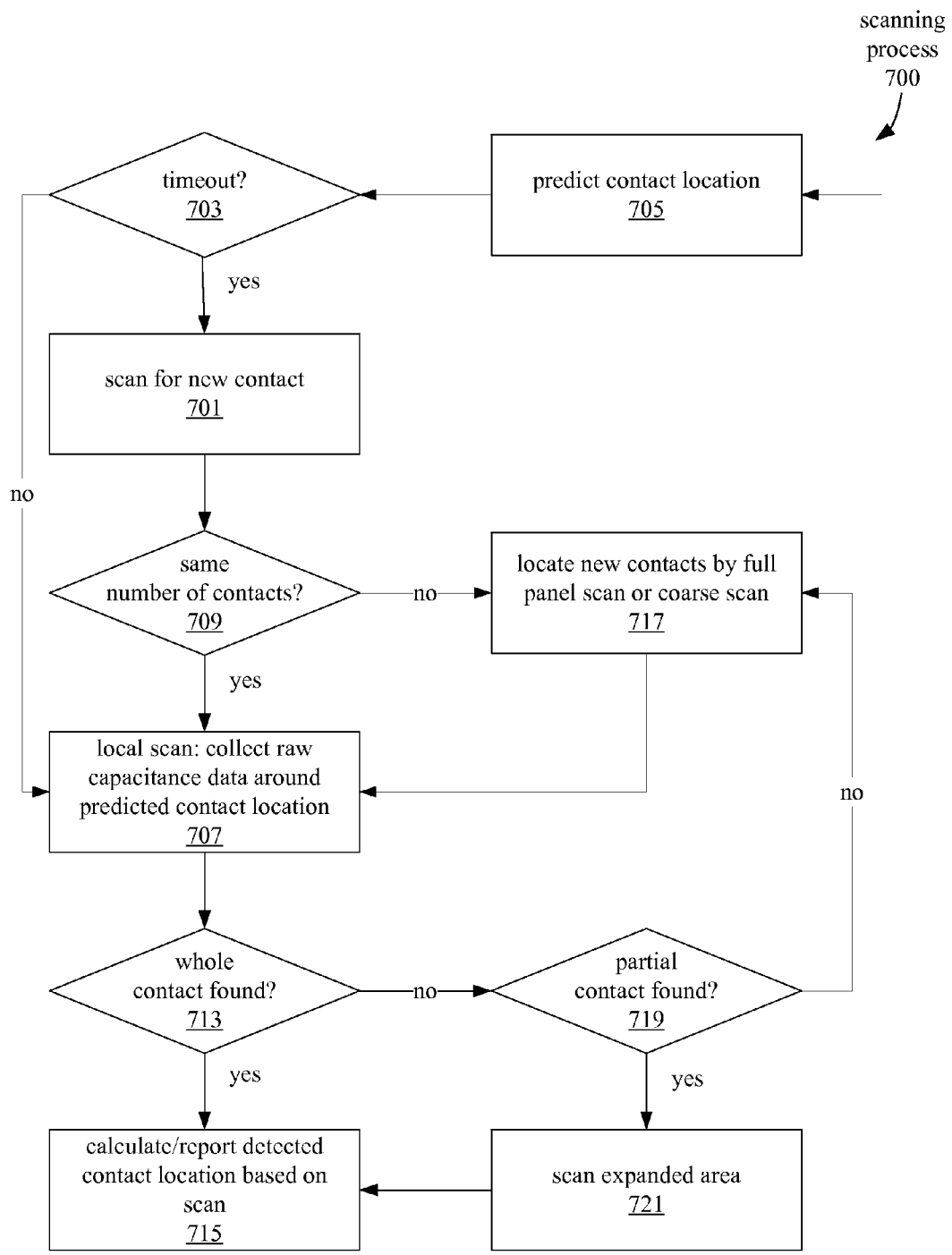
FIG. 7 is flow diagram illustrating a process for scanning a capacitive touch sensor array, according to an embodiment.

FIG. 7 illustrates an embodiment of a process 700 for scanning a touch-sensing surface. In one embodiment, the scanning process 700 may be implemented in a touch-sensing system such as the system illustrated in FIG. 2. In one embodiment, the touch-sensing system may be capable of performing both mutual capacitance and self-capacitance measurements. In one embodiment, the process 700 comprises operations that may be performed in either a processing device such as processing device 110, or in a host such as host 150. Alternatively, the operations of process 700 may be divided between a processing device and a host.

In one embodiment, scanning process 700 begins at block 701. At block 701, a touch-sensing system may perform an initial scan of a touch-sensing surface to detect a new contact at the touch-sensing surface. In one embodiment, the scan may be a mutual capacitance scan of a touch-sensing surface, such as touch-sensing surface 600, as illustrated in FIG. 6A. In one embodiment, the scan at block 701 may cover the entire sensing area of a touch-sensing surface to detect a new contact anywhere in the sensing area. In one embodiment, process 700 repeats the scanning operations associated with block 701 until a touch is initially detected. In an alternate embodiment, the scan at block 701 may be a self-capacitance scan of electrodes comprising one axis of the touch-sensing surface, such as touch-sensing surface 600, as illustrated in FIG. 6A. In one embodiment, a self-capacitance scan that indicates more than one touch may cause the system to switch to a mutual capacitance scanning method to determine the number of touches. From block 701, the process 700 continues at block 709.

At block 709, based on the scan performed at block 701, the touch-sensing system determines whether the number of contacts at the touch-sensing surface has changed since the previous scan. From block 709, if the number of contacts has not changed, then the process 700 continues at block 707. Otherwise, if the number of contacts has changed, then the process 700 continues at block 717.

At block 717, the process 700 locates new contacts by a full panel scan or a coarse scan of the touch sensing surface. In one embodiment, the number of contacts at block 709 may change because a contact was added to or removed from the touch-sensing surface. In one embodiment, if the number of contacts has increased, the touch-sensing system locates the one or more new contacts by performing a full self-capacitance scan (for a single contact) or mutual capacitance scan (for multiple contacts) of the entire touch-sensing panel, or a coarse scan of a pattern of sensor elements. The coarse scan may include, for example, a self-capacitance scan of alternate rows and columns of sensor elements. Alternatively, a coarse scan may include a mutual capacitance scan of a subset of unit cells of the touch-sensing panel. From block 717, the process 700 continues at block 707.

At block 707, the touch-sensing system may perform a local scan to collect raw capacitance data from sensor unit cells around a predicted contact location. In one embodiment, if the contact is a new contact identified at block 701, then the local scan of block 707 may be performed within a search window surrounding an approximate location of the new contact as determined by the full panel or coarse scan of block 717. Otherwise, if the contact is not a new contact, then the predicted contact location may have been calculated at block 705. In one embodiment, the local scan is performed on unit cells within a search window, such as search window 501 or 611, as illustrated in FIGS. 5 and 6A, respectively. In one embodiment, the search window may be centered around the contact location predicted at block 705. For example, search window 611 of FIG. 6A is centered around predicted contact location 610. From block 707, the process 700 continues at block 713.

At blocks 713 and 719, the touch-sensing system determines whether the raw capacitance data represent a whole contact (block 713) or a partial contact (block 715). In one embodiment, a centroid location for a whole contact can be determined based on only the capacitance values measured from within the search window, while a centroid location for a partial contact may be determined based on capacitance values measured from within the search window in addition to capacitance values measured from outside the search window. If the touch-sensing system determines that the capacitance data represents a whole contact, the process 700 continues at block 715. If the touch-sensing system instead identifies a partial contact, the process 700 continues at block 721.

At block 721, the touch-sensing system scans an expanded area to obtain additional capacitance data for resolving a location of the partial contact from block 719. For example, the touch-sensing system may scan sensor elements in an extended search window, such as extended search window 621, as illustrated in FIG. 6A. From block 721, the process 700 continues at block 715.

At block 715, the touch-sensing system calculates a resolved contact location of the whole contact or of multiple contacts, based on the capacitance data from blocks 707 and 721. The touch-sensing system may report the location as touch coordinates to a host computer, such as host 150 of FIG. 1. From block 715, the process 700 continues back to block 705.

At block 705, the touch-sensing system predicts a contact location based on the scan at block 701, where the predicted contact location is associated with a time of a subsequent scan. In one embodiment, the prediction of the contact location may be based on one or more previously determined locations of the same contact. For example, the touch-sensing system may determine a velocity or acceleration for the contact based on previous locations of the contact, and determine a predicted location that accounts for the velocity or acceleration. Alternatively, the touch-sensing system may use a last known location of the contact, such as the contact location determined at block 715, as the predicted location of the contact.

In one embodiment, the next predicted location following the resolution of a first touch location may be centered on the first touch location. Once the second touch location is resolved, the two touch locations provide a velocity vector that may be used to predict a location for the third scan. Once three resolved touch locations are available, then an acceleration of the conductive object can be determined. In one embodiment, the previous one, two, or three resolved locations of the touch can then be used for a subsequent prediction depending on the velocity and acceleration. In one embodiment, the previously resolved locations of the touch may also be used to shape the area of the fine scan window. If the acceleration is 0, then the last two points may be used. If the velocity is zero, then the last point may be used in the prediction. The predicted location of block 705 may be used for a local scan performed as provided at block 707. From block 705, the process 700 continues at block 703.

At block 703, if a timeout has elapsed, the process 700 continues at block 701. Accordingly, in one embodiment, the timeout determines an interval for periodically scanning for new contacts, as provided at block 701. If, at block 703, the timeout has not elapsed, the process 700 continues with a local scan as provided at block 707. In one embodiment, the timeout may elapse upon the passage of a time duration; alternatively, the timeout may expire after a pre-selected number of scans have been performed.

In one embodiment, the process 700 thus repeats while the touch-sensing system is in operation to continuously track the locations of one or more conductive objects on or proximate to the touch-sensing surface.

In one embodiment, the local scanning and additional contact detection methods are not limited to detection and tracking of fingers, but may be used to track other objects such as active or passive styli, or may be used to detect and track conductive objects in proximity to, but not necessarily contacting, the touch-sensing surface. In one embodiment, the local scanning and additional contact detection methods may also be applicable to non-capacitive touchscreen sensing methods which use an array of sensing locations.

Embodiments of the present invention, described herein, include various operations. These operations may be performed by hardware components, software, firmware, or a combination thereof. As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method comprising:
  determining a first resolved location of a conductive object proximate to a touch-sensing surface based on self-capacitance measurements of individual sensor electrodes of the touch-sensing surface in a self-capacitance mode;
  measuring first self-capacitances of a first set of sensor electrodes of the individual sensor electrodes disposed in a first axis of the touch-sensing surface; and
  measuring second self-capacitances of a second set of sensor electrodes of the individual sensor electrodes disposed in a second axis of the touch-sensing surface;
  in response to determining the first resolved location of the conductive object, switching from operation in the self-capacitance mode to operation in a mutual capacitance mode; and
  in response to determining the first resolved location of the conductive object, tracking a movement of the conductive object over the touch-sensing surface by determining a different resolved location of the conductive object for each of a plurality of consecutive mutual capacitance measurements of pairs of the sensor electrodes of the touch sensing surface while in the mutual capacitance mode, wherein performing each of the mutual capacitance measurements comprises measuring a mutual capacitance between at least one pair of the pairs of sensor electrodes of the touch-sensing surface, wherein the determining the first resolved location comprises:

determining that the conductive object is no longer present proximate to the touch-sensing surface during the mutual capacitance mode;

in response to the determining that the conductive object is no longer present during the mutual capacitance mode, switching from the operation in the mutual capacitance mode to the operation in the self-capacitance mode;

in response to the switching to the self-capacitance mode, measuring third self-capacitances of the first set of sensor electrodes to detect a second presence of the conductive object or a new conductive object proximate to the touch-sensing surface; and measuring fourth self-capacitances of the second set of sensor electrodes only when the second presence is detected in the measuring the third self-capacitances.

2. The method of claim 1, further comprising performing the self-capacitance measurements by measuring a self-capacitance for each of a plurality of sensor electrodes of the touch-sensing surface, wherein the plurality of sensor electrodes comprises the first set and the second set.

3. The method of claim 2, further comprising performing at least one of the mutual capacitance measurements, wherein the performing the at least one of the mutual capacitance measurements comprises measuring a capacitance for each of a subset of intersections between the pairs of sensor electrodes of the plurality of sensor electrodes, wherein a number of intersections in the subset of intersections is less than a number of intersections of the plurality of sensor electrodes sensed during the self-capacitance measurements.

4. The method of claim 1, wherein an area of the touch-sensing surface sensed by each of the mutual capacitance measurements is less than an area of the touch-sensing surface included by the self-capacitance measurements.

5. The method of claim 1, further comprising, based on the first resolved location of the conductive object, calculating a predicted location for the conductive object corresponding to a time at which a first mutual capacitance measurement of the plurality of mutual capacitance measurements is performed.

6. The method of claim 5, further comprising performing at least one of the mutual capacitance measurements, wherein the performing the at least one of the mutual capacitance measurements measuring a capacitance for each of a subset of intersections between the pairs of sensor electrodes of the plurality of sensor electrodes intersecting within a search window surrounding the predicted location.

7. The method of claim 1, wherein a spatial resolution of the self-capacitance measurements is different from a spatial resolution of the mutual capacitance measurements.

8. A method comprising:

resolving an initial location of a conductive object proximate to a touch-sensing surface by performing self-capacitance measurements of the touch-sensing surface in a self-capacitance mode, wherein the touch-sensing surface comprises rows of sensor electrodes and columns of sensor electrodes; and determining a search window based on the resolved initial location;

in response to resolving the initial location of the conductive object, switching from operation in the self-capacitance mode to operation in a mutual capacitance mode;

in response to resolving the initial location of the conductive object, tracking a movement of the conductive object over the touch-sensing surface by determining a different resolved location of the conductive object for each of a plurality of consecutive mutual capacitance measurements of the search window while in the mutual capacitance mode, wherein performing each of the mutual capacitance measurements comprises measuring a capacitance between at least one pair of sensor electrodes of the touch-sensing surface;

identifying that the conductive object is located at an edge of the search window or outside of the search window based on the mutual capacitance measurements; and when the conductive object is detected at the edge of the search window or outside of the search window, scanning at least one or more additional rows or columns of sensor electrodes that are adjacent to rows or columns within the search window without scanning an entire set of the rows and columns of sensor electrodes.

9. The method of claim 8, wherein performing the self-capacitance measurements comprises measuring a capacitance for each of a plurality of sensor electrodes of the touch-sensing surface, wherein the plurality of sensor electrodes comprise the row of sensor electrodes and the column of sensor electrodes.

10. The method of claim 9, wherein performing at least one of the mutual capacitance measurements comprises measuring a capacitance for each of a subset of intersections between the pairs of sensor electrodes of the plurality of sensor electrodes, wherein a number of intersections in the subset of intersections is less than a number of intersections of the plurality of sensor electrodes sensed during the self-capacitance measurements.

11. The method of claim 8, wherein an area of the touch-sensing surface sensed using each of the mutual capacitance measurements is less than an area of the touch-sensing surface sensed using the self-capacitance measurements.

12. The method of claim 8, further comprising, based on the first resolved location of the conductive object, calculating a predicted location for the conductive object corresponding to a time at which a first mutual capacitance measurement of the plurality of mutual capacitance measurements is performed.

13. The method of claim 12, wherein performing the first mutual capacitance measurement comprises measuring a capacitance for each of a subset of intersections between the pairs of sensor electrodes of the plurality of sensor electrodes intersecting within the search window, and wherein the search window surrounds the predicted location.

14. The method of claim 8, wherein determining the search window further comprises identifying an area surrounding a predicted location of the conductive object as the search window.

15. The method of claim 8, wherein a spatial resolution of the self-capacitance measurements is different from a spatial resolution of the mutual capacitance measurements.

16. A touch-sensing system, comprising:

a capacitive sensor array comprising a plurality of sensor electrodes;

a capacitance sensor configured to measure a self-capacitance of each of the plurality of sensor electrodes in a self-capacitance mode and to measure a mutual capacitance for each intersection between pairs of sensor electrodes of the plurality of sensor electrodes in a mutual capacitance mode; and processing logic configured to, in response to determining a first resolved location of the conductive object using self-capacitance measurements of the plurality of sensor electrodes, switch from operation in the self-capacitance mode to operation in the mutual capacitance mode, and in response to determining the first resolved location of the conductive object using the self-capacitance measurements, track movement of the conductive object over the capacitive sensor array by determining a different resolved location of the conductive object for each of a plurality of consecutive mutual capacitance measurements of the pairs of the plurality of sensor electrodes of the capacitive sensor array while in the mutual capacitance mode, wherein performing each of the mutual capacitance measurements comprise comprises measuring a mutual capacitance between at least one pair of sensor electrodes of the capacitive sensor array, wherein the processing logic is further to:

measure first self-capacitances of a first set of the plurality of sensor electrodes disposed in a first axis of the touch-sensing surface; and measure second self-capacitances of a second set of the plurality of sensor electrodes disposed in a second axis of the touch-sensing surface;

determine that the conductive object is no longer present proximate to the touch-sensing surface during the mutual capacitance mode;

in response to the conductive object is no longer being present during the mutual capacitance mode, switch from the operation in the mutual capacitance mode to the operation in the self-capacitance mode;

in response to the switching to the self-capacitance mode, measure third self-capacitances of the first set of sensor electrodes to detect a second presence of the conductive object or a new conductive object proximate to the touch-sensing surface; and measure fourth self-capacitances of the second set of sensor electrodes only when the second presence is detected in the measuring the third self-capacitances.

17. The touch-sensing system of claim 16, wherein a spatial resolution of the self-capacitance measurements is different from a spatial resolution of the mutual capacitance measurements.

18. The touch-sensing system of claim 16, wherein the capacitance sensor is further configured to perform at least one of the mutual capacitance measurements by measuring the mutual capacitance for each of a subset of intersections between the pairs of sensor electrodes of the plurality of sensor electrodes, wherein a number of intersections in the subset of intersections is less than a number of intersections of the plurality of sensor electrodes sensed during the self-capacitance measurements.

19. The touch-sensing system of claim 16, further comprising a touch-sensing surface, wherein the touch-sensing surface comprises the capacitive sensor array, and wherein an area of the touch-sensing surface sensed for each of the mutual capacitance measurements is less than an area of the touch-sensing surface sensed using the self-capacitance measurements.

20. The touch-sensing system of claim 16, wherein the processing logic is further configured to, based on the first resolved location of the conductive object, calculate a predicted location for the conductive object corresponding to a time at which the mutual capacitance measurements are performed, wherein performing the first mutual capacitance measurement comprises measuring a capacitance for each of a subset of intersections between the pairs of sensor electrodes of the plurality of sensor electrodes intersecting within a search window surrounding the predicted location.

* * * * *